United States Patent
Yamamoto et al.

(10) Patent No.: US 9,039,060 B1
(45) Date of Patent: May 26, 2015

(54) UTILITY VEHICLE

(71) Applicant: Kawasaki Jukogyo Kabushiki Kaisha, Hyogo (JP)

(72) Inventors: Teruaki Yamamoto, Kakogawa (JP); Yoshiyuki Kuroyanagi, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/139,979

(22) Filed: Dec. 24, 2013

(51) Int. Cl.
*B60R 16/04* (2006.01)
*B60N 2/68* (2006.01)

(52) U.S. Cl.
CPC .................................. *B60N 2/68* (2013.01)

(58) Field of Classification Search
CPC .......................................................... B60N 2/68
USPC ............ 296/26.1, 26.09, 26.11, 65.09, 183.1, 296/26.08
IPC .................................. B62D 25/00; B60R 16/04
See application file for complete search history.

(56) References Cited

U.S. PATENT DOCUMENTS

| | | | |
|---|---|---|---|
| 6,905,159 B1* | 6/2005 | Saito et al. ................. | 296/65.01 |
| 6,994,388 B2 | 2/2006 | Saito et al. | |
| 7,578,544 B1* | 8/2009 | Shimamura et al. ....... | 296/183.2 |
| 7,971,919 B2* | 7/2011 | Vertanen ...................... | 296/39.2 |
| 8,226,144 B2* | 7/2012 | Sheikhha et al. .......... | 296/26.08 |
| 8,322,767 B2* | 12/2012 | Morita et al. .............. | 296/24.33 |
| 2011/0148146 A1* | 6/2011 | Takaya et al. .............. | 296/183.1 |
| 2011/0156420 A1* | 6/2011 | Yasui et al. ................. | 296/26.1 |
| 2011/0156423 A1* | 6/2011 | Kawabata et al. .......... | 296/26.1 |
| 2012/0032465 A1* | 2/2012 | Morita et al. .............. | 296/26.09 |
| 2012/0056411 A1* | 3/2012 | Nakamura et al. ........... | 280/756 |
| 2014/0262583 A1* | 9/2014 | Url ............................... | 180/233 |

* cited by examiner

*Primary Examiner* — Pinel Romain
(74) *Attorney, Agent, or Firm* — Wenderoth, Lind & Ponack, L.L.P.

(57) ABSTRACT

A utility vehicle is equipped with a riding space and a cargo bed disposed behind the riding space. A screen is disposed between the riding space and the cargo bed, and screen support members extended rear-downward are supported by pivot portions on the screen. Engaging portions engageable with the screen support members are provided on the cargo bed.

8 Claims, 10 Drawing Sheets

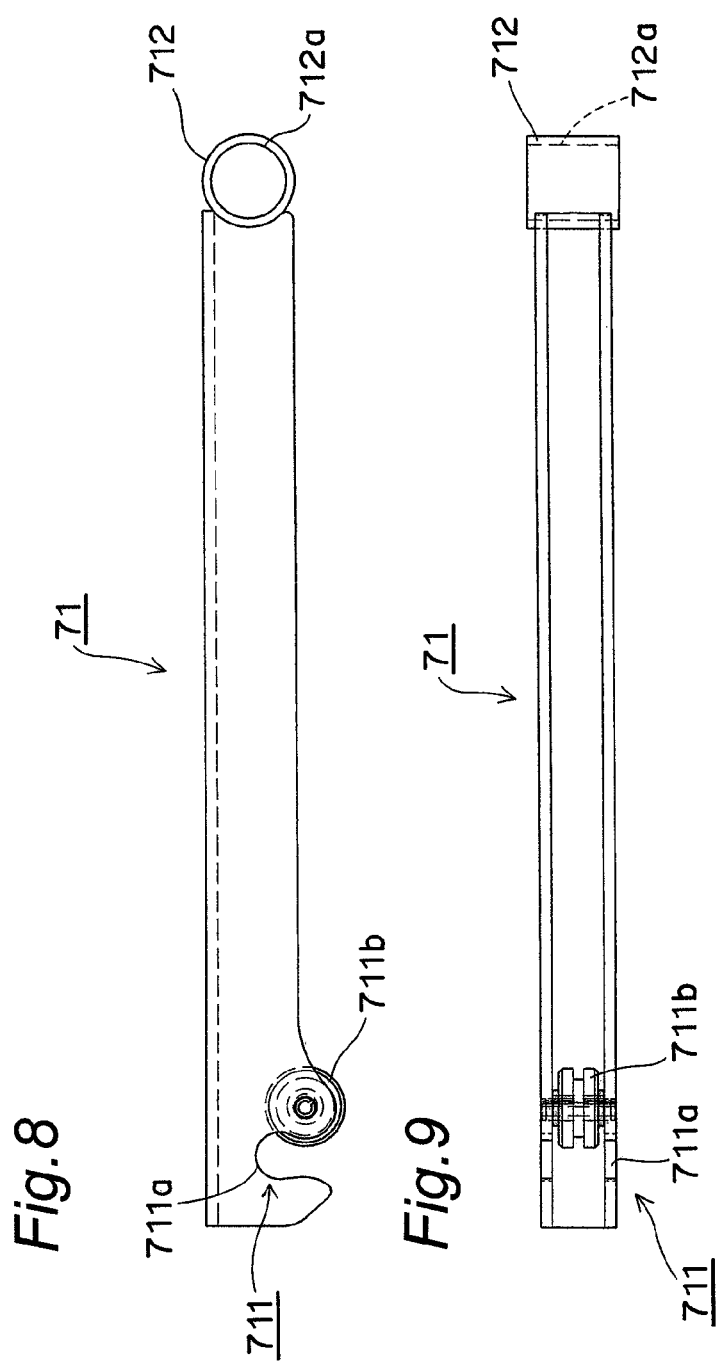

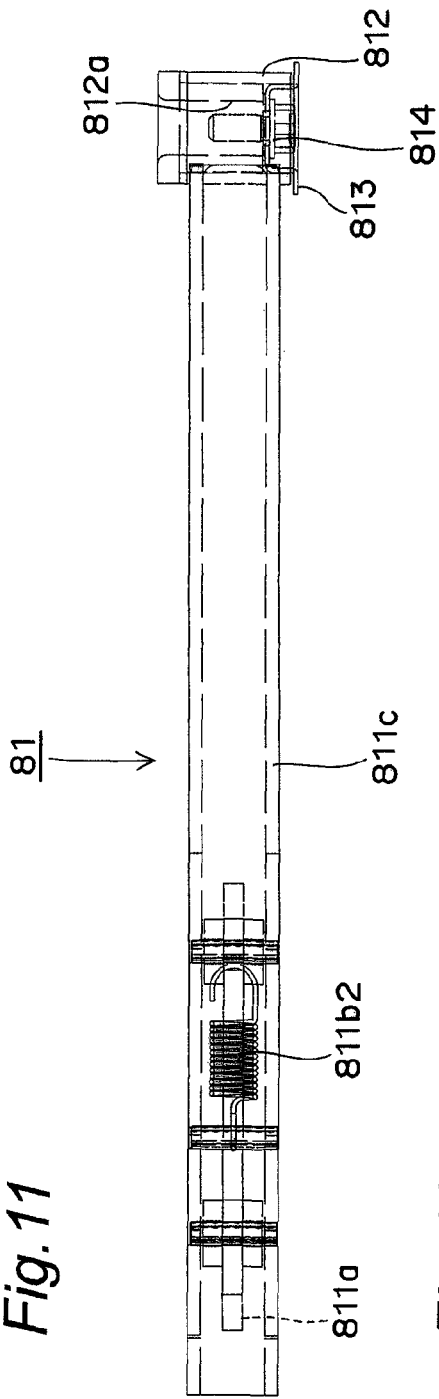
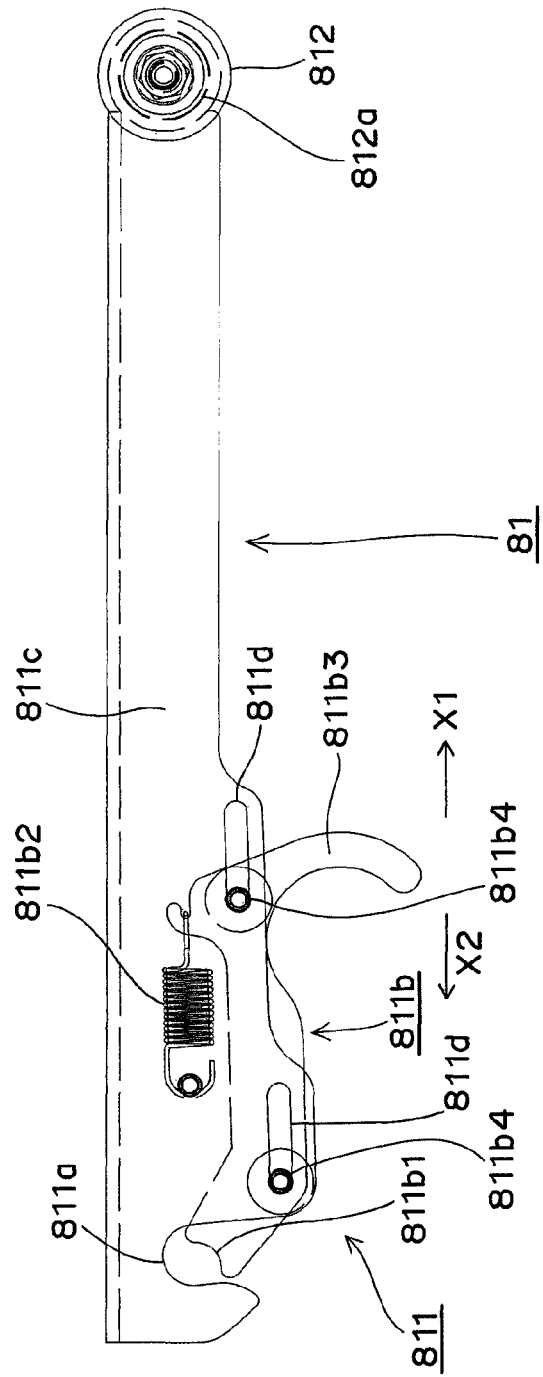

UTILITY VEHICLE

BACKGROUND OF THE INVENTION

1. Field of the Invention

The present invention relates to a utility vehicle in which a screen is disposed between a riding space and a cargo bed disposed behind the riding space.

2. Description of the Related Art

Conventionally, in a utility vehicle in which a screen is disposed between a riding space and a cargo bed disposed behind the riding space, the screen is supported at the front end of the cargo bed as disclosed in U.S. Pat. No. 6,994,388, for example.

SUMMARY OF THE INVENTION

A screen is herein provided between a cargo bed and a riding space.

Accordingly, an object of the present invention is to provide a utility vehicle in which a method for fixing a screen capable of being moved back and forth is simplified so that the workability of the method can be improved.

For the purpose of attaining the above-mentioned object, the present invention provides a utility vehicle equipped with:

a riding space and a cargo bed disposed behind the riding space, wherein a screen is disposed between the riding space and the cargo bed, screen support members extended rear-downward are supported by pivot portions provided on the screen, and engaging portions engageable with the screen support members are provided on the cargo bed.

With the above-mentioned configuration, since the screen is supported on the cargo bed using the screen support members extended rear-downward from the pivot portions of the screen, operability during the movement of the screen in the front-rear direction can be improved.

It is preferable that the utility vehicle according to the present invention has the following configurations.

(1) The cargo bed, the state of which can be changed between an expanded state in which the cargo bed is expanded forward into the riding space and a non-expanded state in which the cargo bed does not occupy the riding space, is equipped with left and right fixed side walls and left and right expansion side walls that are expandable into the riding space, the screen has the front wall of the cargo bed and the position of the screen can be changed in the front-rear direction between the expanded state and the non-expanded state, the pivot portions are provided at the end portions of the screen to rotatably support the screen support members, and the engaging portions are respectively provided on the fixed side walls and the expansion side walls.

(2) In the above-mentioned configuration (1), the expansion side walls are foldable.

(3) In the above-mentioned configuration (1), the expansion side walls are slidable.

(4) The screen support members are each configured so as to be engaged with the engaging portions using a first elastic member.

(5) The screen support members are each configured so as to be engaged with the engaging portions using a trigger-type opening/closing mechanism.

(6) In the above-mentioned configuration (1), the screen support members are each supported by the pivot portion via a second elastic member.

(7) The pivot portions are mounted so as to pass through the left and right end portions of the screen.

(8) Sliding members that move on the bottom plate of the cargo bed are provided at the lower end of the screen.

With the above-mentioned configuration (1), in the utility vehicle in which the state of the cargo bed can be changed between the expanded state and the non-expanded state and the position of the screen can be changed in the front-rear direction according to the change of the state of the cargo bed between the expanded state and the non-expanded state, operability during the movement of the screen can be improved further in each of the expanded state and the non-expanded state of the cargo bed.

With the above-mentioned configuration (2), in the utility vehicle in which the state of the cargo bed can be changed between the expanded state and the non-expanded state by folding or extending the expansion side walls, operability during the movement of the screen can be improved further in each of the expanded state and the non-expanded state of the cargo bed.

With the above-mentioned configuration (3), in the utility vehicle in which the state of the cargo bed can be changed between the expanded state and the non-expanded state by sliding the expansion side walls, operability during the movement of the screen can be improved further in each of the expanded state and the non-expanded state of the cargo bed.

The above-mentioned configurations (4) and (5) are respectively specific configurations of the screen support members. With these configurations, the screen support members can be mounted on the cargo bed. Furthermore, with these configurations, the screen support members can be mounted and dismounted easily.

With the above-mentioned configuration (6), when the position of the screen is changed in the front-rear direction, the screen is allowed to be set by the second elastic members to a state in which the screen has an angle with respect to the width direction of the vehicle, that is, in the left-right direction. In other words, one worker can easily change the position of the screen in the front-rear direction.

With the above-mentioned configuration (7), the workability of the mounting of the pivot portions on the left and right end portions of the screen can be improved.

With the above-mentioned configuration (8), the screen can be moved with light force.

Consequently, the present invention can provide a utility vehicle in which operability during the movement of the screen can be improved further.

BRIEF DESCRIPTION OF THE DRAWINGS

FIG. 8 is a side view showing a screen support member;

FIG. 9 is a bottom view showing the screen support member;

FIG. 10 is a side view showing a screen support member, a modification of the screen support member;

FIG. 11 is a bottom view showing the modified screen support member; and

DETAILED DESCRIPTION OF THE INVENTION

Figure 1:
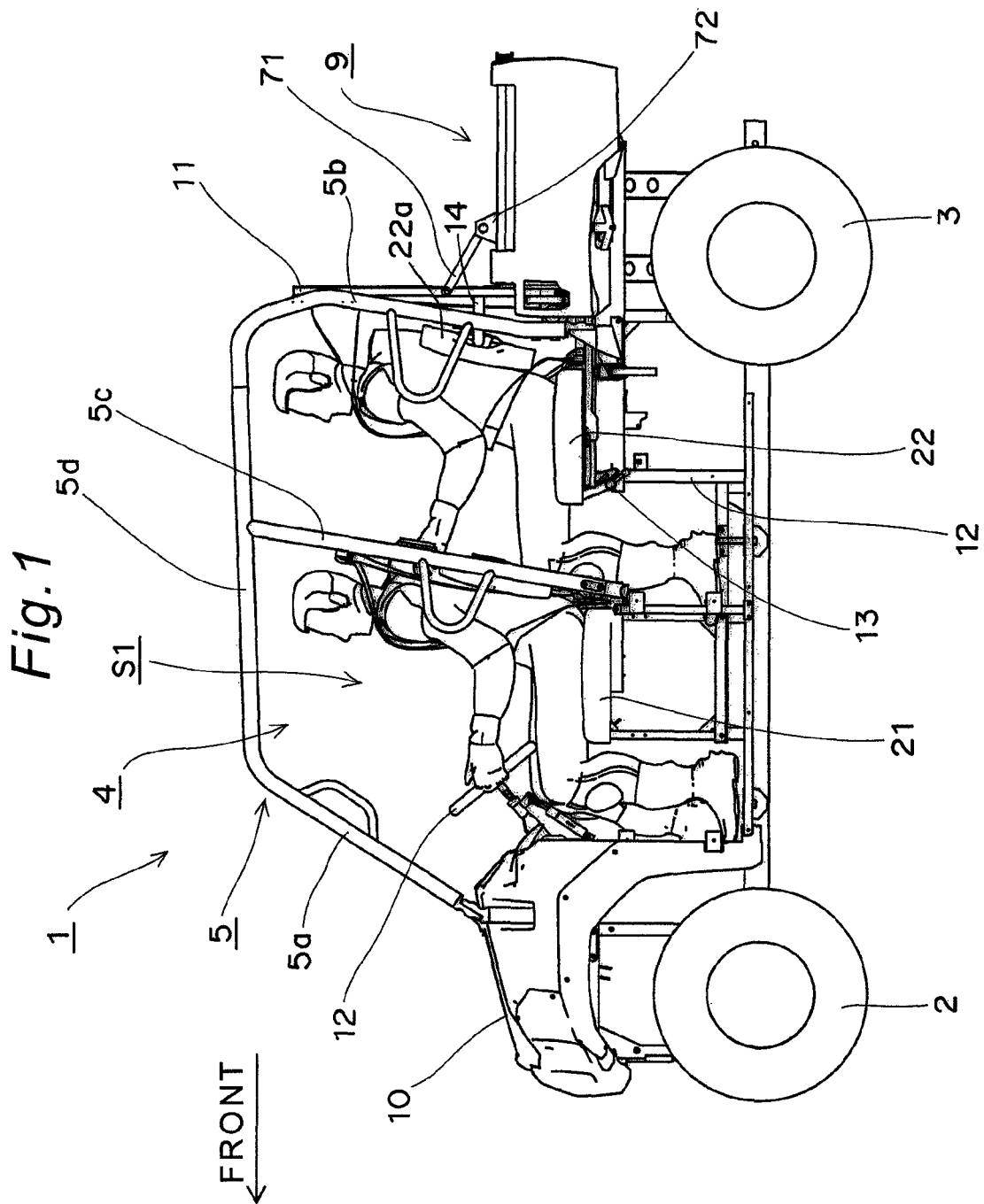
FIG. 1 is a left side view showing a utility vehicle according to an embodiment of the present invention.

FIG. 1 is a left side view showing a utility vehicle according to an embodiment of the present invention. It is described that the concept of the direction used in this embodiment coincides with the concept of the direction viewed from the position of the driver of the utility vehicle.

[Overall Structure of the Vehicle]

As shown in FIG. 1, a utility vehicle 1 is equipped with a pair of left and right front wheels 2 on the front side of a vehicle body, a pair of left and right rear wheels 3 on the rear side of the vehicle body, and a riding space (cabin) 4 between the front wheels 2 and the rear wheels 3. The riding space 4 is enclosed with a ROPS 5. In addition, an expandable cargo bed 9 is provided behind the riding space 4, and a bonnet 10 is provided in front of the riding space 4. Furthermore, at the front end portion of the cargo bed 9, a screen 11 is provided to partition the riding space 4 from the cargo bed 9. A bench-type front seat 21 is installed on the front half portion of the riding space 4, and a retractable bench-type rear seat 22 is installed on the rear half portion of the riding space 4. The rear seat 22 is rotatably supported by the upper end portions of support legs 12 and can be retracted to the rear side of the front seat 21 when rotated forward around its turning axis 13. On the other hand, the backrest 22a of the rear seat 22 is supported by the backrest support member 14 provided for the screen 11. The seat area S1 on the left side of the front seat 21 is a driver's seat, and operation devices, such as a steering wheel 12, are provided on the front left side of the seat area S1.

[Structure of the ROPS]

The ROPS (roll-over protective structure) 5 is part of the vehicle frame and equipped with a pair of left and right front vertical members (side ROPS) 5a, a pair of left and right rear vertical members (side ROPS) 5b, and pair of left and right middle vertical members (side ROPS) 5c disclosed between the front vertical members 5a and the rear vertical members 5b, and a plurality of upper end beam members 5d for connecting the upper end portions of the above-mentioned respective vertical members 5a, 5b and 5c.

[Structures of the Cargo Bed and the Screen]

Figure 2:
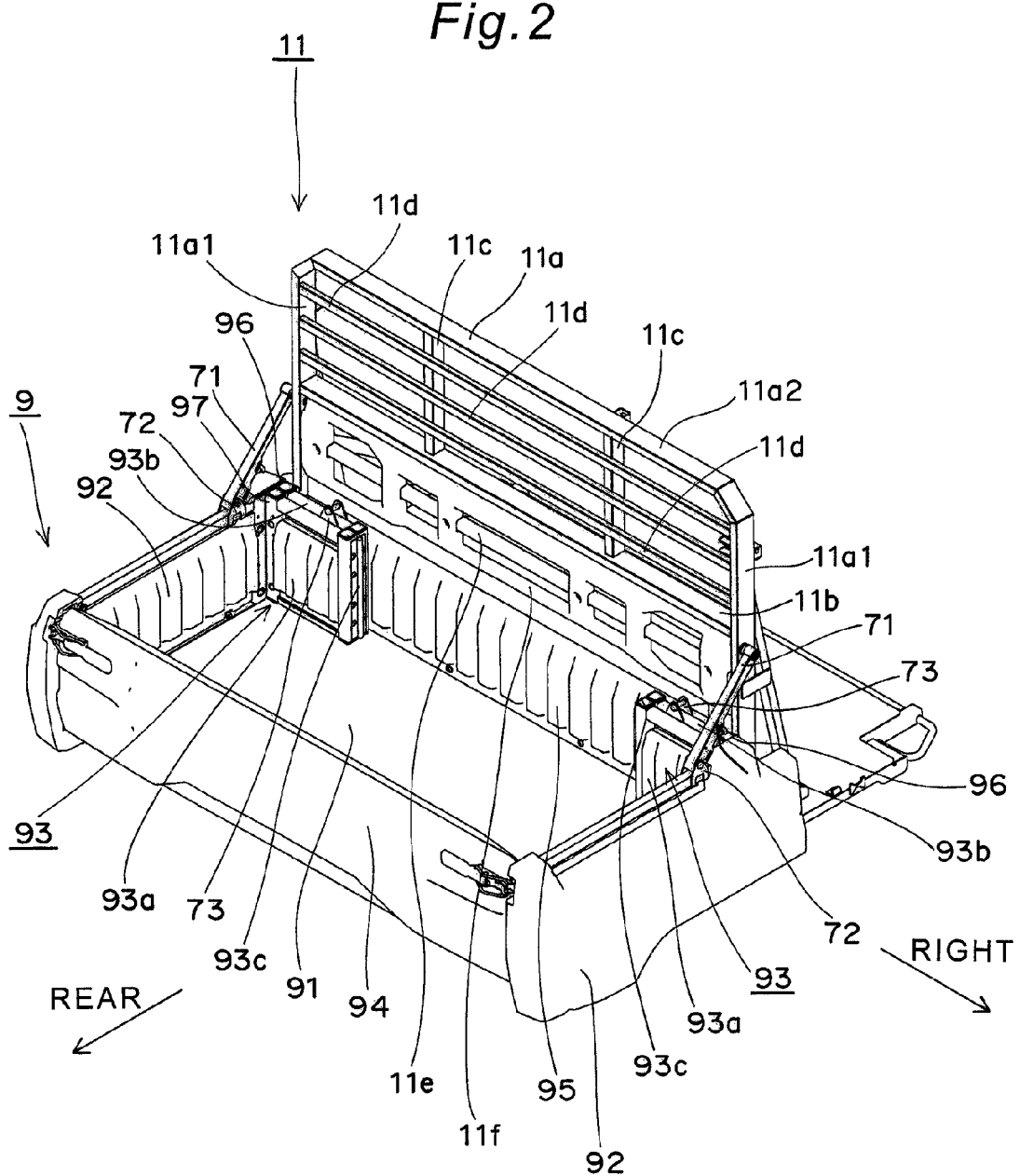
FIG. 2 is a rear perspective view showing the cargo bed and the screen of the utility vehicle shown in FIG. 1, the cargo bed being in its non-expanded state.
Figure 3:
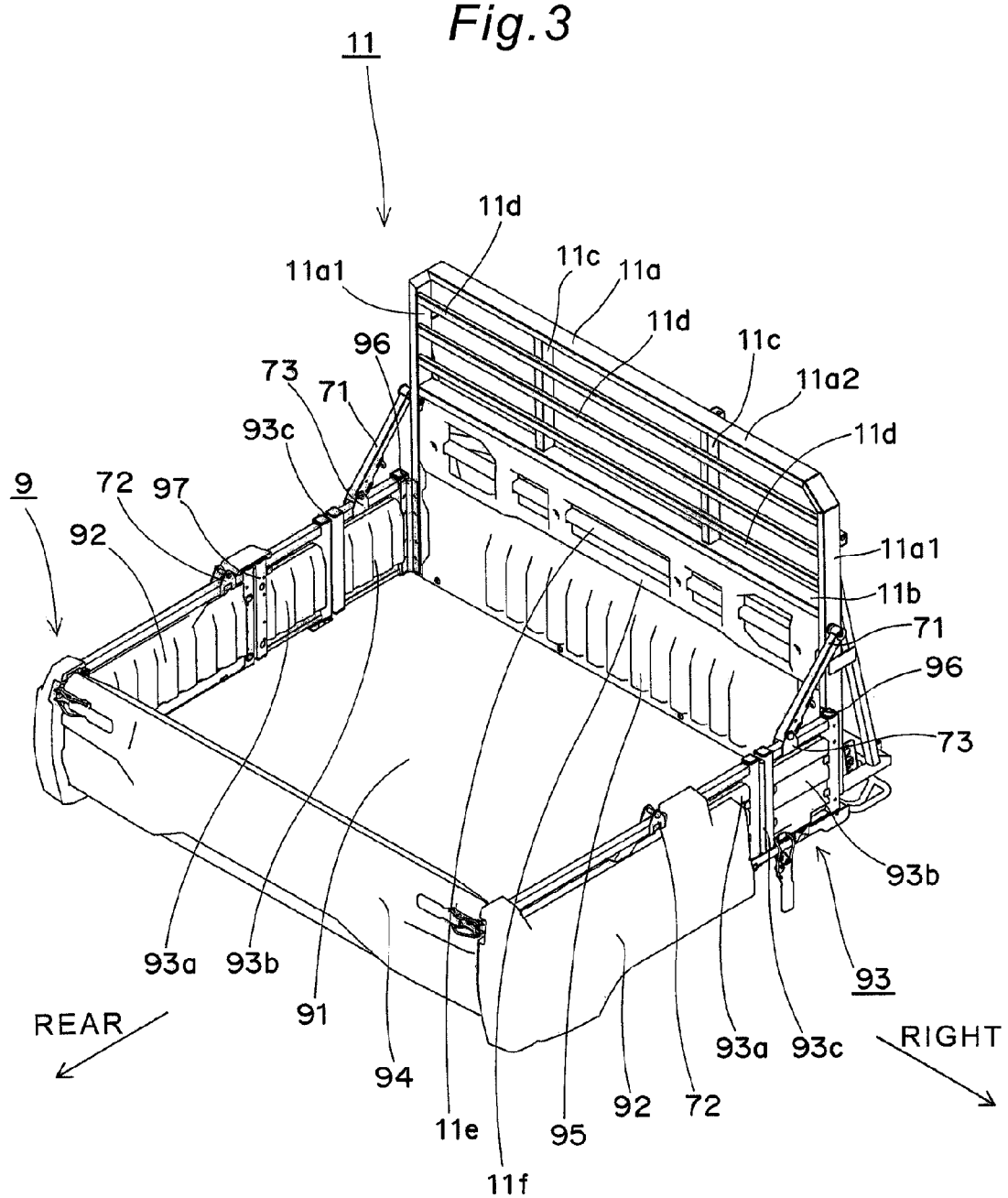
FIG. 3 is a rear perspective view showing the cargo bed and the screen of the utility vehicle shown in FIG. 1, the cargo bed being in its expanded state.

FIG. 2 is a rear perspective view showing the cargo bed 9 and the screen 11 of the utility vehicle 1 shown in FIG. 1, the cargo bed 9 being in its non-expanded state. FIG. 3 is a rear perspective view showing the cargo bed 9 and the screen 11 of the utility vehicle 1 shown in FIG. 1, the cargo bed 9 being in its expanded state.

As shown in FIGS. 2 and 3, the cargo bed 9 is equipped with a bottom plate 91, left and right fixed side walls 92, left and right expansion side walls 93, a rear wall 94 and a front wall 95. The left and right expansion side walls 93 are provided on the front side of the left and right fixed side walls 92. Furthermore, the left and right expansion side walls 93 are connected to the front wall 95 via front hinges 96 and also connected to the left and right fixed side walls 92 via rear hinges 97. Moreover, each of the left and right expansion side walls 93 is formed of two plate members 93a and 93b connected to each other via a middle hinge 93c so as to be foldable via the middle hinge 93c. When the left and right expansion side walls 93 are folded as shown in FIG. 2, the cargo bed 9 is set to its non-expanded state. On the other hand, when the left and right expansion side walls 93 are extended linearly as shown in FIG. 3, the cargo bed 9 is set to its expanded state. In this case, the rear seat 22 is folded and retracted to the rear side of the front seat 21.

The screen 11 is equipped with an outer frame 11a having a nearly U shape, a cross member 11b provided at the nearly central portion of the width of the outer frame 11a in the up-down direction, a plurality of vertical cross-piece members 11c and a plurality of horizontal cross-piece members 11d disposed in the upper half portion of the outer frame 11a, and a sub-cross member 11e and a cover member 11f disposed in the lower half portion of the outer frame 11a.

The outer frame 11a is integrally equipped with a pair of left and right pillar portions 11a1 and an upper beam portion 11a2 for integrally connecting the upper end portions of both the pillar portions 11a1 and is made by bending and forming a single square pipe. The lower end portions of both the pillar portions 11a1 are extended downward to the bottom plate 91 of the cargo bed 9, and the front wall 95 of the cargo bed 9 is installed at the lower end portions of both the pillar portions 11a1.

The vertical cross-piece members 11c and the horizontal cross-piece members 11d of the screen 11 are each made of a metal pipe having a nearly rectangular shape in cross-section. The screen 11 according to the embodiment is equipped with the two vertical cross-piece members 11c and the three horizontal cross-piece members 11d. The two vertical cross-piece members 11c are disposed between the left and right pillar portions 11a1 at intervals in the width direction of the vehicle. The upper end of each vertical cross-piece member 11c is secured to the upper beam portion 11a2 of the outer frame 11a by welding, and the lower end of each vertical cross-piece member 11c is secured to the cross member 11b by welding. The three horizontal cross-piece members 11d are disposed at nearly equal intervals between the upper beam portion 11a2 and the cross member 11b in the up-down direction. The left and right end portions of each horizontal cross-piece member 11d are secured to the left and right pillar portions 11a1, respectively, by welding. In addition, the vertical cross-piece member 11c is secured to the front faces of the horizontal cross-piece members 11d by welding at portions intersecting the horizontal cross-piece members 11d. As describe above, the upper half portion of the screen 11 is formed into a lattice (or grid) shape using the two vertical cross-piece members 11c and the three horizontal cross-piece members 11d, and the respective openings separated by the outer frame 11a, the vertical cross-piece members 11c, the horizontal cross-piece members 11d and the cross member 11b have a nearly rectangular shape being long in the width direction of the vehicle.

Figure 4:
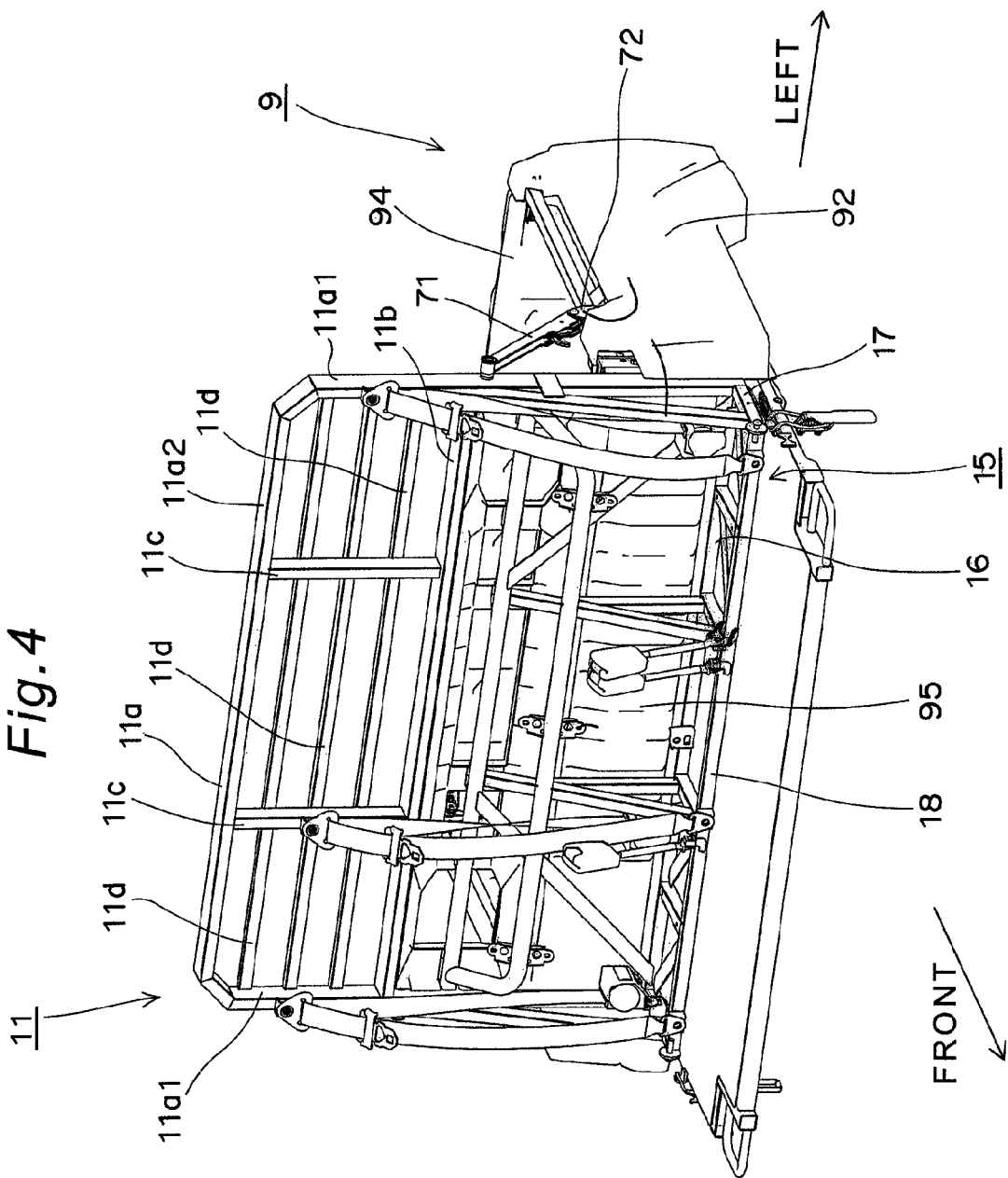
FIG. 4 is a front perspective view of FIG. 2.

FIG. 4 is a front perspective view of FIG. 2. As shown in FIG. 4, the lower ends of both the pillar portions 11a1 are connected using a lower beam member 16 made of a metal pipe and extended in the width direction of the vehicle. Both the end portions of the lower beam member 16 in the width direction of the vehicle are secured t the respective pillar portions 11a1 by welding. In addition, side pipes 17 for stand use extended forward are integrally secured to the lower ends of both the pillar portions 11a1 by welding, and the front end portions of both the side pipes 17 are connected using a front pipe 18 for stand use extended in the width direction of the vehicle. Both the end portions of the front pipe 18 in the width direction of the vehicle are secured to the front end portions of the side pipes 17 by welding. In other words, a stand frame 15 having a nearly rectangular shape in planar view is composed of the pair of side pipes 17, the front pipe 18 and the lower beam member 16.

Figure 5:
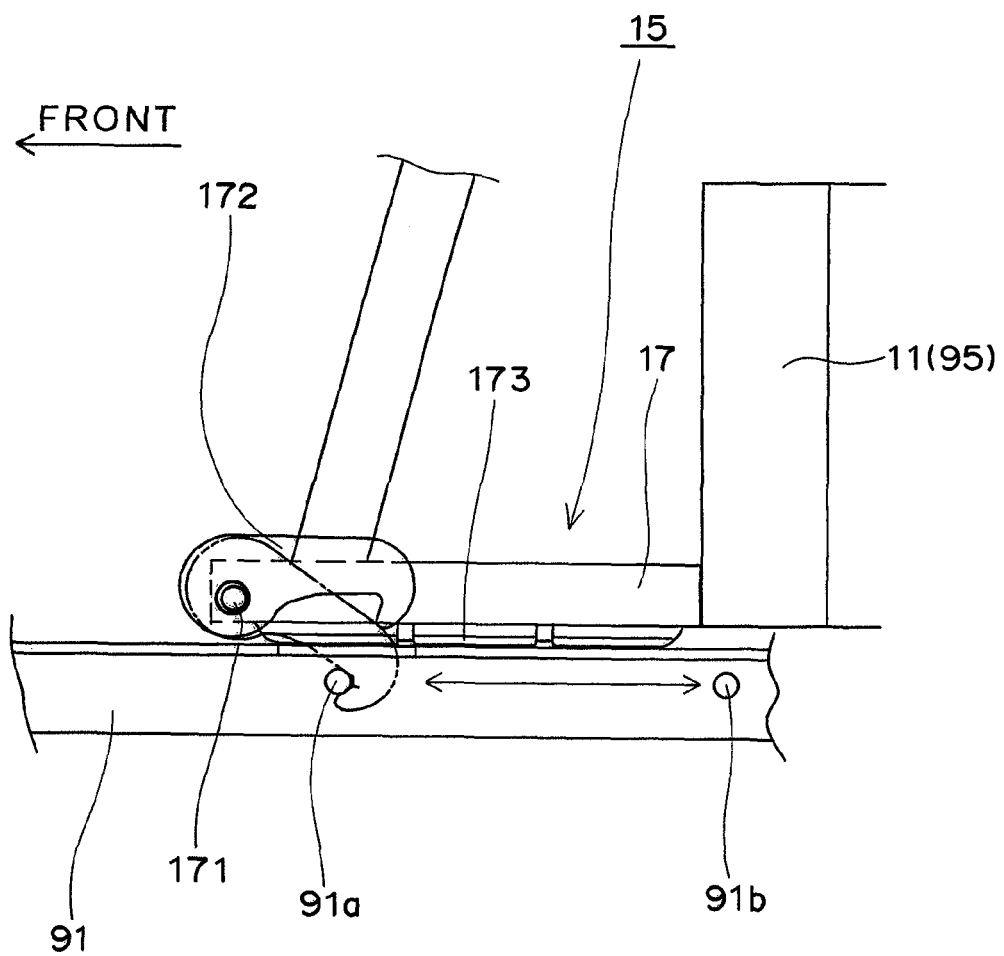
FIG. 5 is an enlarged side view showing the side end portion of a stand frame.

FIG. 5 is an enlarged side view showing the side end portion of the stand frame 15. As shown in FIG. 5, a support shaft 171 is provided at the front end portion of the side pipe 17 of the stand frame 15, and a lock hook 172 extended rearward is supported by this support shaft 171 so as to be rotatable in the up-down direction. On the other hand, on the side face of the bottom plate 91 of the cargo bed 9, an engagement pin 91*a* is provided on the front side, and an engagement pin 91*b* is provided on the rear side. The screen 11 and the front wall 95 of the cargo bed 9 can be secured to a predetermined cargo bed expansion position by engaging the lock hook 172 with the engagement pin 91*a*. The screen 11 and the front wall 95 of the cargo bed 9 can be secured to a predetermined cargo bed non-expansion position by engaging the lock hook 172 with the engagement pin 91*b*. Furthermore, a sliding member (sled) 173 made of resin is secured to the lower face of the side pipe 17. A checkered steel sheet is formed on the upper face of the bottom plate 91.

[Configuration of Screen Support Members]

As shown in FIGS. 2 to 4, a screen support member 71 rotatably supports each pillar portion 11*a*1. As shown in FIG. 2, in the non-expanded state of the cargo bed 9, each screen support member 71 is extended rear-downward and is detachably engaged with an engaging portion 72 provided on the upper face of the fixed side wall 92. Furthermore, as shown in FIG. 3, in the expanded state of the cargo bed 9, each screen support member 71 is extended rear-downward and is detachably engaged with an engaging portion 73 provided on the upper face of the plate member 93*b* on the front side of the expansion side wall 93.

Figure 6:
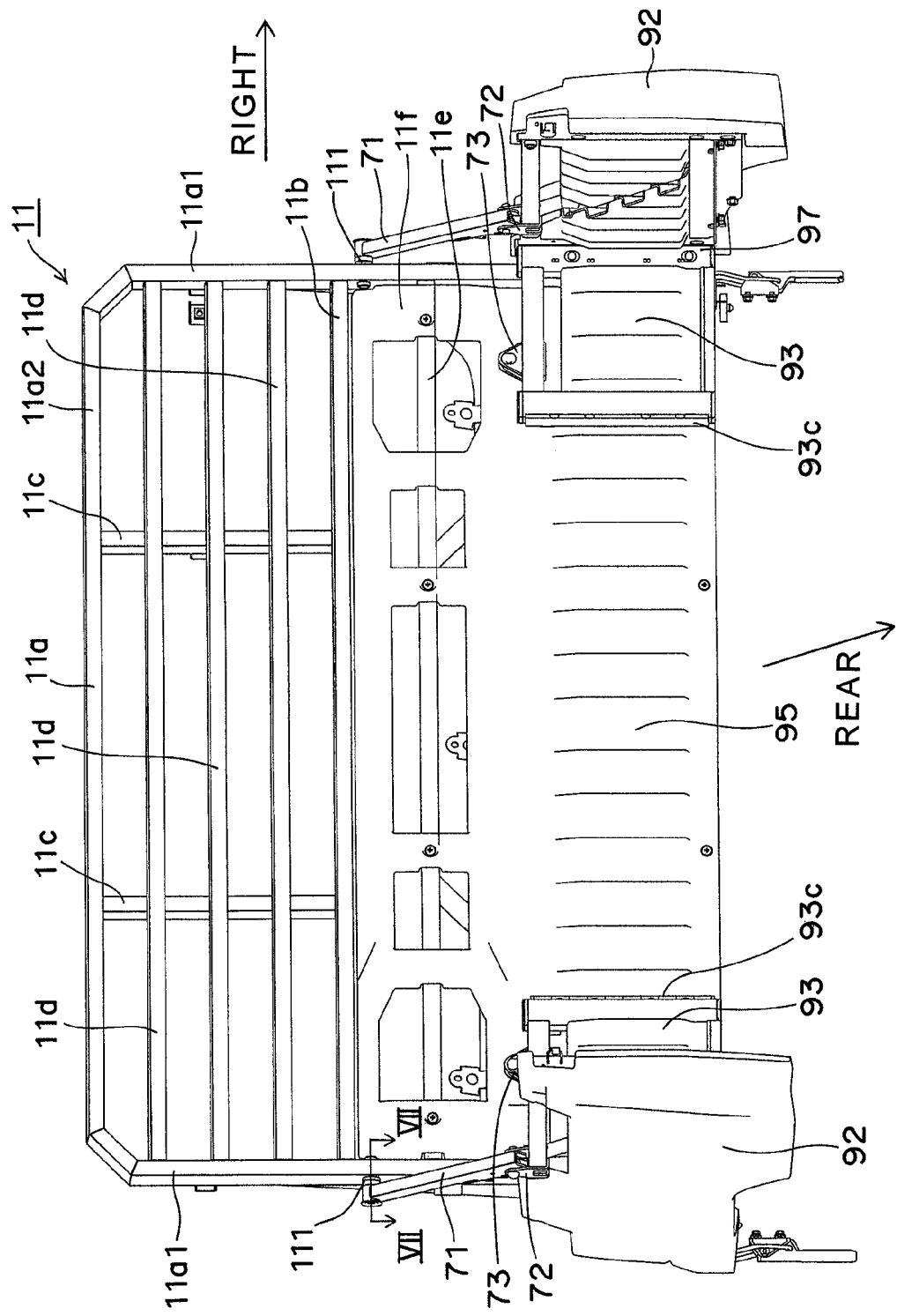
FIG. 6 is a rear perspective view of FIG. 2.
Figure 7:
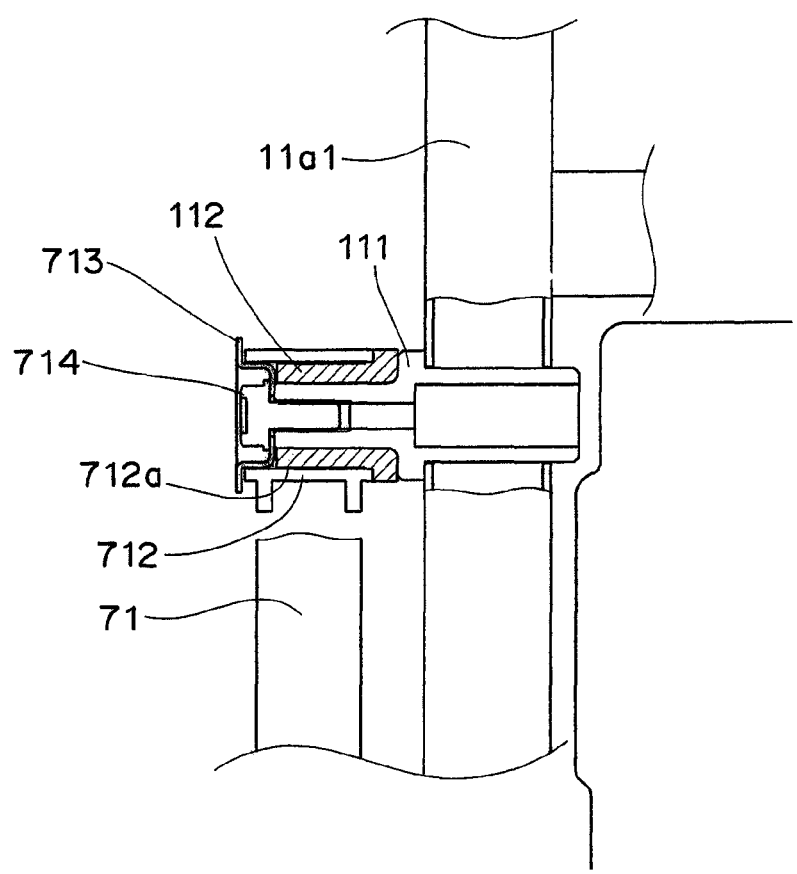
FIG. 7 is a sectional view taken on line VII-VII of FIG. 6.

FIG. 6 is a rear perspective view of FIG. 2, and FIG. 7 is a sectional view taken on line VII-VII of FIG. 6. As shown in FIGS. 6 and 7, a pivot portion 111 for rotatably supporting the screen support member 71 is formed on each pillar portion 11*a*1. The pivot portion 111 is provided so as to pass through the pivot portion 11*a*1. An elastic member (second elastic member) 112 is mounted on the outer end portion of the pivot portion 111 in the width direction of the vehicle (in the left-right direction), and the screen support member 71 is supported by the pivot portion 111 via the elastic member 112. Moreover, a bolt 714 is inserted into the pivot portion 111 via a washer 713 from the outer end of the pivot portion 111 in the width direction of the vehicle to prevent the screen support member 71 from coming off the pivot portion 111.

FIG. 8 is a side view showing the screen support member 71, and FIG. 9 is a bottom view showing the screen support member 71. As shown in FIGS. 8 and 9, the screen support member 71 is equipped with an engaged portion 711 engageable with the engaging portion 72 (in FIGS. 2 and 3) and the engaging portion 73 (in FIGS. 2 and 3) at one end portion and a fitting portion 712 to be fitted on the pivot portion 111 (in FIGS. 6 and 7) at the other end portion. The engaged portion 711 is equipped with a concave portion 711*a* into which the engaging portion 72 (in FIGS. 2 and 3) or the engaging portion 73 (in FIGS. 2 and 3) is fitted and an elastic member (first elastic member) 711*b* for pressing the engaging portion 72 (in FIGS. 2 and 3) or the engaging portion 73 (in FIGS. 2 and 3) to prevent the engaging portion 72 (in FIGS. 2 and 3) or the engaging portion 73 (in FIGS. 2 and 3) fitted in the concave portion 711*a* from coming off easily. Beside, a hole 712*a* into which the elastic member 112 mounted at the tip end portion of the pivot portion 111 is inserted and fitted is formed in the fitting portion 712. Furthermore, the screen support member 71 is made rotatable with respect to the pivot portion 111 (in FIGS. 6 and 7) by virtue of slidable contact between the elastic member 112 and the fitting portion 712.

[Operations of the Rear Seat, Cargo Bed and Screen]

Operations regarding the retraction of the rear seat 22, the expansion of the cargo bed 9 and the forward movement of the screen 11 will be described below.

FIGS. 1 and 2 show that the cargo bed 9 is in its non-expanded state and that the rear seat 22 is in its sittable state, and the screen 11 is located rearward at its non-expansion position together with the front wall 95 of the cargo bed 9. In the states shown in FIGS. 1 and 2, first, the engaged portion 711 (in FIGS. 8 and 9) of the screen support member 71 is disengaged from the engaging portion 72. Then, the lock hook 172 shown in FIG. 5 is rotated forward and disengaged from the engaging pin 91*b*. Furthermore, the rear seat 22 shown in FIG. 1 is rotated forward around the turning axis 13 so as to be retracted to the rear side of the front seat 21.

Next, the screen 11 and the front wall 95 shown in FIG. 2 are moved forward integrally. At this time, since the screen 11 has a lattice shape, the worker can easily grasp the arbitrary position of the screen 11. In addition, as shown in FIG. 2, since the screen support member 71 is supported by the pivot portion 111 via the second elastic member 112, when the screen 11 is moved forward, the screen 11 is allowed to be set by the second elastic member 112 to a state in which the screen 11 has an angle with respect to the width direction of the vehicle. Then, the expansion side wall 93, having been folded, is extended linearly as shown in FIG. 3 by moving the screen 11 and the front wall 95 forward. Furthermore, as shown in FIG. 5, when the screen 11 and the front wall 95 are moved, the sliding member 173 of the stand frame 15 slides on the upper face of the bottom plate 91 of the cargo bed 9.

As shown in FIG. 5, when the screen 11 and the front wall 95 have been moved forward to the cargo bed expansion position, the lock hook 172 is rotated rearward and engaged with the engagement pin 91*a*, whereby the screen 11, the front wall 95 and the expansion side wall 93 are secured in their expanded states. Then, as shown in FIG. 3, the fitting portion 712 of the screen support member 71 is engaged with the engaging portion 73.

The operations relating to the displacement of the rear seat 22 to its sittable state, the shrinkage of the cargo bed 9 and the rearward movement of the screen 11 are carried out by reversing the above-mentioned operations.

With the utility vehicle having the above-mentioned configuration can produce the following advantages.

(1) Since the screen 11 is supported on the cargo bed 9 using the screen support members 71 extended rear-downward from the pivot portions 111 of the screen 11, operability during the movement of the screen in the front-rear direction can be improved.

(2) In the utility vehicle 1, in which the state of the cargo bed 9 can be changed between the expanded state and the non-expanded state and the position of the screen 11 can be changed in the front-rear direction according to the change of the state of the cargo bed 9 between the expanded state and the non-expanded state, operability during the movement of the screen 11 can be improved further in each of the expanded state and the non-expanded state of the cargo bed 9.

(3) In the utility vehicle 1 in which the state of the cargo bed 9 can be changed between the expanded state and the non-expanded state by folding or extending the expansion side walls 93, operability during the movement of the screen 11 can be improved further in each of the expanded state and the non-expanded state of the cargo bed 9.

(4) Since the screen support member 71 is designed so as to be engaged with the engaging portion 72 and the engaging portion 73 using the first elastic member 711b, the screen support member 71 can be mounted on the cargo bed 9. Furthermore, since the first elastic member 711b can prevent the engaging portion 72 or the engaging portion 73 having been fitted in the concave portion 711a from coming off easily, the mounting and dismounting of the screen support member 71 on and from the cargo bed 9 can be carried out easily without requiring any separate coming-off prevention mechanism.

(5) Since the screen support members 71 are supported by the pivot portions 111 via the second elastic members 112, when the position of the screen 11 is changed in the front-rear direction, the screen 11 is allowed to be set by the second elastic members 112 to a state in which the screen 11 has an angle with respect to the width direction of the vehicle, that is, in the left-right direction. In other words, one worker can easily change the position of the screen 11 in the front-rear direction.

(6) Since the pivot portion 111 is provided so as to pass through the pillar portion 11a1 of the screen 11, the workability of the mounting of the pivot portion 111 on the pillar portion 11a1 can be improved.

(7) Since the screen 11 is mounted on the front wall 95 and the expansion side walls 93 is mounted on the front wall 95 and the fixed side wall 92 so as to be foldable, the position of the screen 11 can be changed between the expansion position and the non-expansion position by extending or folding the expansion side wall 93 without lifting the screen 11.

(8) Since the expansion side wall 93 is connected to the front wall 95 via the front hinge 96 and to the fixed side wall 92 via the rear hinge 97 and the plate members 93a and 93b are connected to each other via the middle hinge 93c, the configuration of the foldable expansion side wall 93 can be attained.

(9) Since the sliding member 173 is mounted at the lower end of the screen 11, that is, on the lower face of the side pipe 17 of the stand frame 15, the screen 11 can be moved with light force. Furthermore, since the checkered steel sheet is formed on the upper face of the bottom plate 91 of the cargo bed 9 on which the sliding member 173 slides, the sliding member 173 can slide on the bottom plate 91 more smoothly. Moreover, since the screen 11 is moved easily in the front-rear direction, the expansion side walls 93 can be extended or folded easily.

(10) Since the lock hook 172 is provided on the stand frame 15 and the engaging pins 91a and 91b to be engaged with the lock hook 172 are provided on the cargo bed 9, the screen 11 and the front wall 95 of the cargo bed 9 can be fixed at the expansion position and the non-expansion position of the cargo bed 9.

(11) Since the backrest 22a of the rear seat 22 is mounted on the screen 11 via the backrest support member 14, when the screen 11 is moved in the front-rear direction, the backrest 22a is also moved automatically in the front-rear direction, the position of the screen 11 can be changed together with the expansion and shrinkage of the cargo bed 9.

[Modification of the Screen Support Member]

FIG. 10 is a side view showing a screen support member 81, a modification of the screen support member, and FIG. 11 is a bottom view showing the screen support member 81. As shown in FIGS. 10 and 11, the screen support member 81 is equipped with an engaged portion 811 engageable with the engaging portion 72 (in FIGS. 2 and 3) and the engaging portion 73 (in FIGS. 2 and 3) at one end portion thereof and is equipped with a fitting portion 812 to be fitted on the pivot portion 111 (in FIGS. 6 and 7) at the other end portion. The engaged portion 811 is equipped with a concave portion 811a into which the engaging portion 72 (in FIGS. 2 and 3) or the engaging portion 73 (in FIGS. 2 and 3) is fitted and a trigger-type opening/closing mechanism 811b for pressing the engaging portion 72 (in FIGS. 2 and 3) or the engaging portion 73 (in FIGS. 2 and 3) so that the engaging portion 72 (in FIGS. 2 and 3) or the engaging portion 73 (in FIGS. 2 and 3) having been fitted in the concave portion 811a does not come off easily. The trigger-type opening/closing mechanism 811b has a contact portion 811b1 for making contact with the engaging portion 72 (in FIGS. 2 and 3) or the engaging portion 73 (in FIGS. 2 and 3), a spring portion 811b2 for pressing the contact portion 811b1 against the engaging portion 72 (in FIGS. 2 and 3) or the engaging portion 73 (in FIGS. 2 and 3), and a trigger portion 811b3 for pulling the spring portion 811b2 against the compression force of the spring portion 811b2. In addition, the trigger-type opening/closing mechanism 811b is mounted on a main body portion 811c via pins 811b4 that are movable in the X1 direction and the X2 direction in the figure inside two slots 811d formed in the main body portion 811c so that the trigger-type opening/closing mechanism 811b can slide in the X1 direction and the X2 direction with respect to the main body portion 811c of the engaged portion 811.

A hole 812a into which the elastic member 112 mounted at the tip end portion of the pivot portion 111 (in FIGS. 6 and 7) is inserted and fitted is formed in the fitting portion 812. Moreover, a bolt 814 is inserted into the pivot portion 111 (in FIGS. 6 and 7) via a washer 813 from the outer end of the pivot portion 111 (in FIGS. 6 and 7) in the width direction of the vehicle to prevent the screen support member 81 from coming off the pivot portion 111 (in FIGS. 6 and 7). Furthermore, the screen support member 81 is made rotatable with respect to the pivot portion 111 (in FIGS. 6 and 7) by virtue of slidable contact between the elastic member 112 (in FIG. 7) and the fitting portion 812.

The engagement and disengagement between the screen support member 81 and the engaging portion 73 or the engaging portion 73 is carried out as described below.

When the engaging portion 72 (in FIGS. 2 and 3) or the engaging portion 73 (in FIGS. 2 and 3) is fitted into the concave portion 811a, first, the trigger portion 811b3 is pulled in the X1 direction against the compression force of the spring portion 811b2. Then, the contact portion 811b1 is moved in the X1 direction. As a result, the engaging portion 72 (in FIGS. 2 and 3) or the engaging portion 73 (in FIGS. 2 and 3) can be positioned inside the concave portion 811a. After the positioning, when the pulling of the trigger portion 811b3 in the X1 direction is released, the contact portion 811b1 is moved in the X2 direction by the compression force of the spring portion 811b2, and the contact portion 811b1 makes contact with the engaging portion 72 (in FIGS. 2 and 3) or the engaging portion 73 (in FIGS. 2 and 3). As a result, the engaging portion 72 (in FIGS. 2 and 3) or the engaging portion 73 (in FIGS. 2 and 3) having been fitted in the concave portion 811a is prevented from coming off the concave portion 811a. When the engaging portion 72 (in FIGS. 2 and 3) or the engaging portion 73 (in FIGS. 2 and 3) is disengaged from the concave portion 811a, the trigger portion 811b3 is pulled in the X1 direction to move the contact portion 811b1 in the X1 direction: As a result, the engagement between the engaging portion 72 (in FIGS. 2 and 3) or the engaging portion 73 (in FIGS. 2 and 3) is released, whereby the engagement between the engaging portion 72 (in FIGS. 2 and 3) or the engaging portion 73 (in FIGS. 2 and 3) can be removed from the concave portion 811a.

With the above-mentioned configuration, since the screen support member 81 is designed to make engagement with the engaging portion 72 (in FIGS. 2 and 3) or the engaging portion 73 (in FIGS. 2 and 3) by the trigger-type opening/closing mechanism 811b, the screen support member 81 can be mounted on the cargo bed 9. In addition, since the engaging portion 72 (in FIGS. 2 and 3) or the engaging portion 73 (in FIGS. 2 and 3) having been fitted in the concave portion 811a can be prevented from coming off easily by the trigger-type opening/closing mechanism 811b, the mounting and dismounting of the screen support member 81 on and from the cargo bed 9 can be carried out easily.

[Anther Modification]

Although the expansion side wall 93 has the two plate members 93a and 93b in the above-mentioned embodiment, the number of the plate members is not limited to two. The expansion side wall 93 may have two or more even number of plate members.

Although the front seat 21 and the rear seat 22 are a bench type in the above-mentioned embodiment, they may be a box type.

In the above-mentioned embodiment, the expansion side walls 93 can be folded, and the cargo bed 9 can be set to the expanded state or the non-expanded state by extending or folding the expansion side walls 93. However, the expansion side walls that are used to set the cargo bed 9 to the expanded state or the non-expanded state are not limited to have the folding-type configuration. The expansion side walls may be configured so as to be slidable so that the cargo bed 9 can be set to the expanded state or the non-expanded state.

Figure 12:
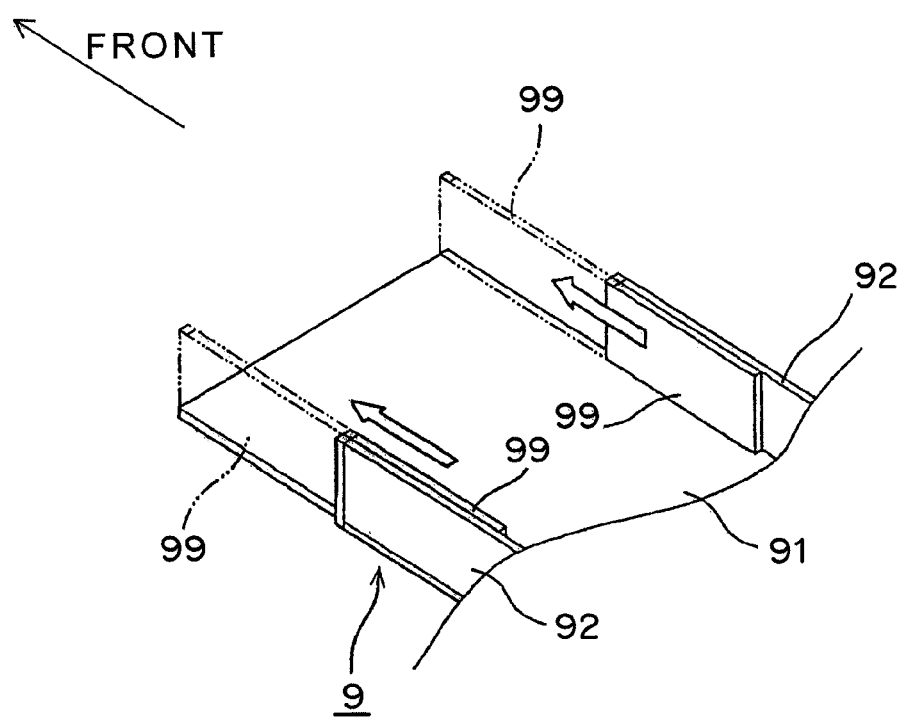
FIG. 12 is a perspective view showing part of the cargo bed of a utility vehicle in which its expansion side walls are slidable.

FIG. 12 is a perspective view showing part of the cargo bed 9 of a utility vehicle in which its expansion side walls are slidable. As shown in FIG. 12, the expansion side walls 99 thereof are positioned inside the fixed side walls 92 in the width direction of the vehicle and are configured so as to be slidable with respect to the fixed side walls 92 in the front-rear direction. As a result, as indicated by two-dot chain lines, the cargo bed 9 can be set to the expanded state by sliding the expansion side walls 99 forward and by positioning the rear ends of the expansion side walls 99 at the front ends of the fixed side walls 92. Conversely, as indicated by solid lines, the cargo bed 9 can be set to the non-expanded state by sliding the expansion side walls 99 rearward and by positioning the front ends of the expansion side walls 99 at the front ends of the fixed side walls 92. However, the other configurations, in particular, the configurations of the screen and the screen support members of the modification are similar to those described in the above-mentioned embodiment. In other words, the screen support members extended rear-downward are rotatably supported by the pivot portions provided at the left and right end portions of the screen, and engaging portions that can be engaged with the screen support members are respectively provided on the fixed side walls 92 and the expansion side walls 99.

With the above-mentioned configuration, in the utility vehicle in which the state of the cargo bed 9 can be changed between the expanded state and the non-expanded state by sliding the expansion side walls 99, operability during the movement of the screen 11 can be improved further in each of the expanded state and the non-expanded state of the cargo bed 9.

Various modifications and changes are possible without departing from the spirit and scope of the present invention described in the appended claims.

What is claimed is:

1. A utility vehicle comprising:
a riding space;
a cargo bed disposed behind the riding space;
a screen disposed between the riding space and the cargo bed;
screen support members extending rear downwardly supported by pivot portions on the screen; and
engaging portions engageable with the screen support members and provided on the cargo bed;
wherein the cargo bed is configured such that the state of the cargo bed can be changed between an expanded state, in which the cargo bed is expanded forward into the riding space, and a non-expanded state, in which the cargo bed does not occupy the riding space, the cargo bed being equipped with left and right fixed side walls and left and right expansion side walls expandable into the riding space;
wherein the screen defines the front wall of the cargo bed, and the screen is movable such that a position of the screen can be changed in a front-rear direction between the expanded state and the non-expanded state;
wherein the pivot portions are provided at end portions of the screen so as to rotatably support the screen support members; and
wherein the engaging portions are respectively provided on the fixed side walls and the expansion side walls of the cargo bed.

2. The utility vehicle according to claim 1, wherein the expansion side walls are foldable.

3. The utility vehicle according to claim 1, wherein the expansion side walls are slidable.

4. The utility vehicle according to claim 1, wherein the screen support members are each configured to engage with the engaging portions via a first elastic member.

5. The utility vehicle according to claim 1, wherein the screen support members are each configured to engage with the engaging portions via a trigger-type opening/closing mechanism.

6. The utility vehicle according to claim 1, wherein the screen support members are each supported by the pivot portion via a second elastic member.

7. The utility vehicle according to claim 1, wherein the pivot portions are mounted so as to pass through left and right end portions of the screen.

8. The utility vehicle according to claim 1, wherein sliding members movable on a bottom plate of the cargo bed are provided at a lower end of the screen.

* * * * *